(12) United States Patent
Kaschalk et al.

(10) Patent No.: US 9,041,717 B2
(45) Date of Patent: May 26, 2015

(54) TECHNIQUES FOR PROCESSING IMAGE DATA GENERATED FROM THREE-DIMENSIONAL GRAPHIC MODELS

(75) Inventors: Michael Kaschalk, Los Angeles, CA (US); Eric A. Daniels, Glendale, CA (US); Brian S. Whited, Glendale, CA (US); Kyle D. Odermatt, Pasadena, CA (US); Patrick T. Osborne, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 733 days.

(21) Appl. No.: 13/230,613

(22) Filed: Sep. 12, 2011

(65) Prior Publication Data

US 2013/0063418 A1   Mar. 14, 2013

(51) Int. Cl.
*G06T 15/00* (2011.01)
*G06T 13/20* (2011.01)

(52) U.S. Cl.
CPC ..................................... *G06T 13/20* (2013.01)

(58) Field of Classification Search
CPC ....................................................... G06T 13/20
USPC .......... 345/419, 619, 620, 621, 473, 474, 475
See application file for complete search history.

(56) References Cited

U.S. PATENT DOCUMENTS

| | | | | |
|---|---|---|---|---|
| 6,974,901 B2 * | 12/2005 | Puryear | ........................... | 84/626 |
| 8,363,721 B2 * | 1/2013 | Tian et al. | ................. | 375/240.12 |
| 8,676,480 B2 * | 3/2014 | Lynch et al. | .................... | 701/119 |
| 8,786,681 B1 * | 7/2014 | Conran et al. | ................... | 348/47 |

* cited by examiner

*Primary Examiner* — Phu K Nguyen
(74) *Attorney, Agent, or Firm* — Patterson & Sheridan LLP

(57) ABSTRACT

Techniques are disclosed for creating animated video frames which include both computer generated elements and hand drawn elements. For example, a software tool may allows an artist to draw line work (or supply other 2D image data) to composite with an animation frame rendered from a three dimensional (3D) graphical model of an object. The software tool may be configured to determine how to animate such 2D image data provided for one frame in order to appear in subsequent (or prior) frames in a manner consistent with changes in rendering the underlying 3D geometry.

15 Claims, 13 Drawing Sheets
(5 of 13 Drawing Sheet(s) Filed in Color)

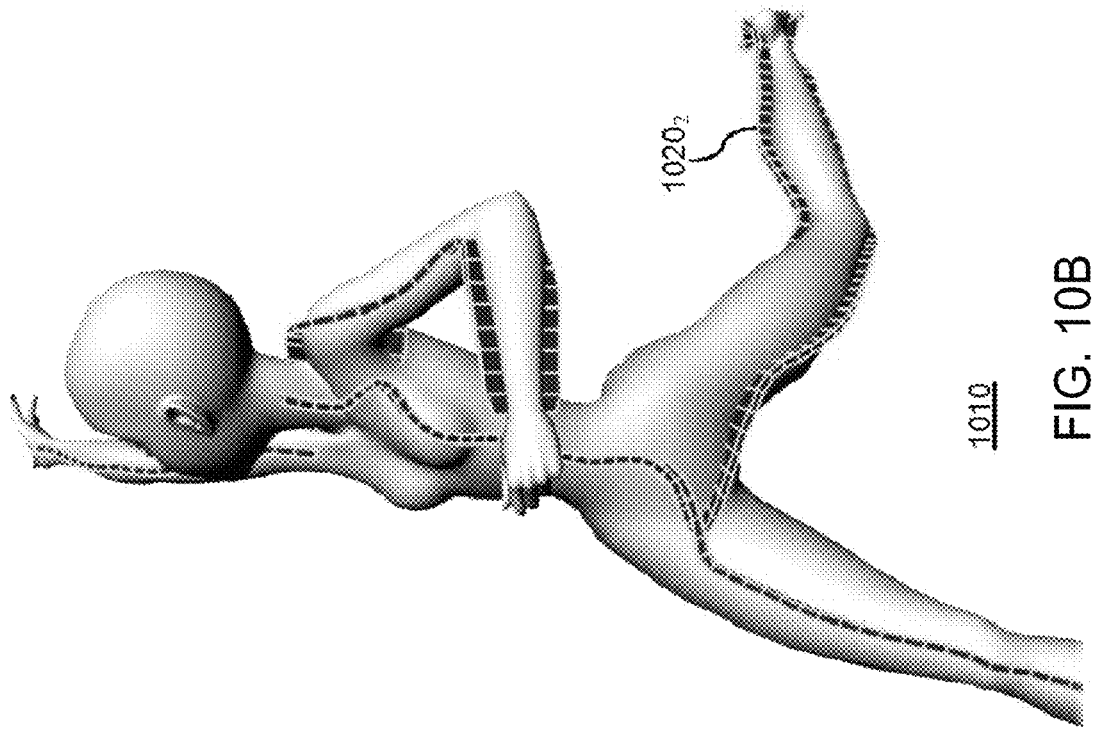
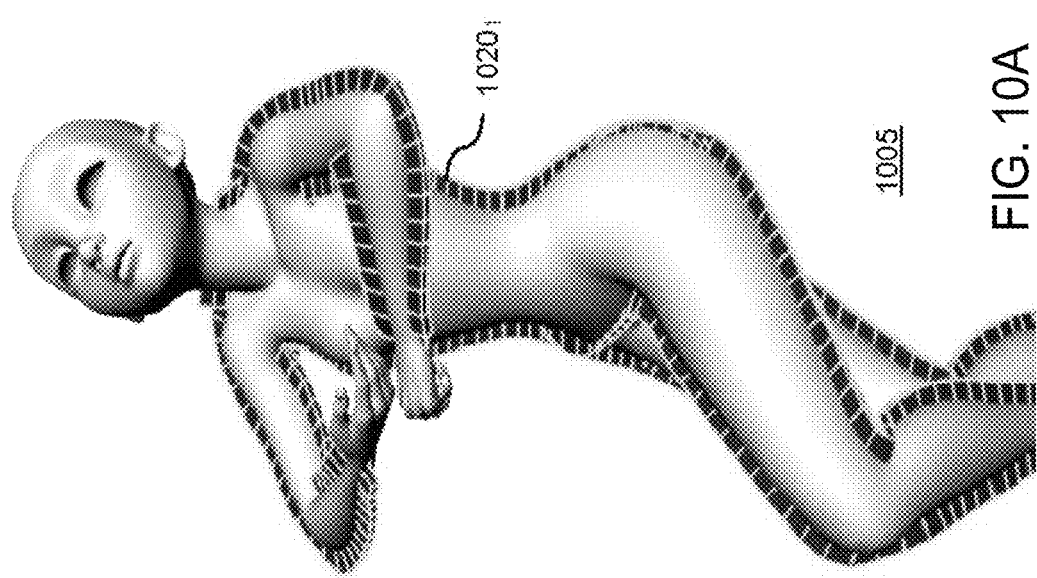

TECHNIQUES FOR PROCESSING IMAGE DATA GENERATED FROM THREE-DIMENSIONAL GRAPHIC MODELS

BACKGROUND

1. Field

Embodiments of the invention are generally directed to animated video sequences. More specifically, embodiments of the invention are directed to hybrid approaches for creating animated video from computer renderings of three-dimensional (3D) models and in some cases hand-drawn line work supplied by animators.

2. Description of the Related Art

For many years, animated video has been created from a set of individually hand drawn frames. In recent years, computer software applications have been developed that can also generate animated video. For example, software may provide an animator with an application used to draw animation frames. Further, computer graphics applications may be used to create animated video from complex 3D models. For example, a broad variety of computer software and techniques have been developed to render computer generated images (CGI) from 3D models. Such approaches have been very successful—both artistically and commercially—at creating animated video.

At the same time, hand drawn animation and CGI rendering each produce distinctive results. For example, in the case of hand-drawn animation, it is difficult for an animator to create consistent line work across many frames, as small wobble or other variation in the individual lines tends to appear from frame to frame. Further, the medium used for hand drawing (e.g., painting with a brush) tends to appear different from frame to frame regardless of how consistent the artist is in painting individual lines. This effect is more apparent when an artist is animating slow or subtle motion. In contrast, the shading, shadow and depth created using CGI rendering produces can provide a very consistent appearance for subtle manipulations of curves. Of course, either approach may be used to produce aesthetically pleasing results and an art director may desire to rely on one form of animation over another to create a particular effect.

SUMMARY

One embodiment disclosed herein includes a method for processing an animation frame. This method may generally include identifying a first animation frame rendered by one or more processors. The first animation frame renders 3D geometry corresponding to a 3D model object at a first point in time. This method may also include generating a screen space velocity map indicating a dynamic velocity of one or more coordinates in the first animation frame relative to changes in points on the 3D model object occurring over one or more specified time steps.

In a particular embodiment, the one or more coordinates in the screen space velocity map are mapped to pixel coordinates in the first animation frame. Further, the dynamic velocity of each coordinate may include both a magnitude and direction of pixel movement. In another embodiment, this method may further include receiving 2D image data to composite with the first animation frame and animating the 2D image data over the specified time step according to the dynamic velocity of the one or more coordinates in the screen space velocity map.

Still another embodiment includes a method for generating a two-dimensional (2D) silhouette for geometry of a 3D graphical model. This method may generally include defining a continuous surface parameterization for at least a portion of the geometry representing the 3D graphical model. A first dimension of the 2D surface parameterization intersects a portion of the surface of the 3D graphical model. This method may also include tracking a silhouette feature over one or more frames. The tracking itself may include identifying a plurality of points on the first dimension of the surface parameterization, and for each of identified point, determining at least one second dimension of the surface parameterization. Each tangent point on the surface of the 3D model is selected so as to be tangent to a viewpoint of a rendering camera. Tracking the silhouette feature over the one or more frames may include connecting the tangent points to produce geometry defining a 2D silhouette for the portion of the surface of the 3D graphical model in each of the one or more frames.

In a particular embodiment, the first dimension of the 2D surface parameterization is determined as a cylindrical feature wrapping a portion of the surface of the 3D graphical model. Further, this method may also include deriving a plurality of closed loops generally perpendicular to an axis of the cylindrical feature. In such a case, determining at least one second dimension of the surface parameterization may include identifying at least one point on the closed loop tangent to the viewpoint of the rendering camera.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

FIGS. 10A-10B illustrate the silhouette flange shown for the 3D model in FIGS. 9A-9B from an alternative camera angle, according to one embodiment of the invention.

DETAILED DESCRIPTION OF THE PREFERRED EMBODIMENTS

Figure 1:
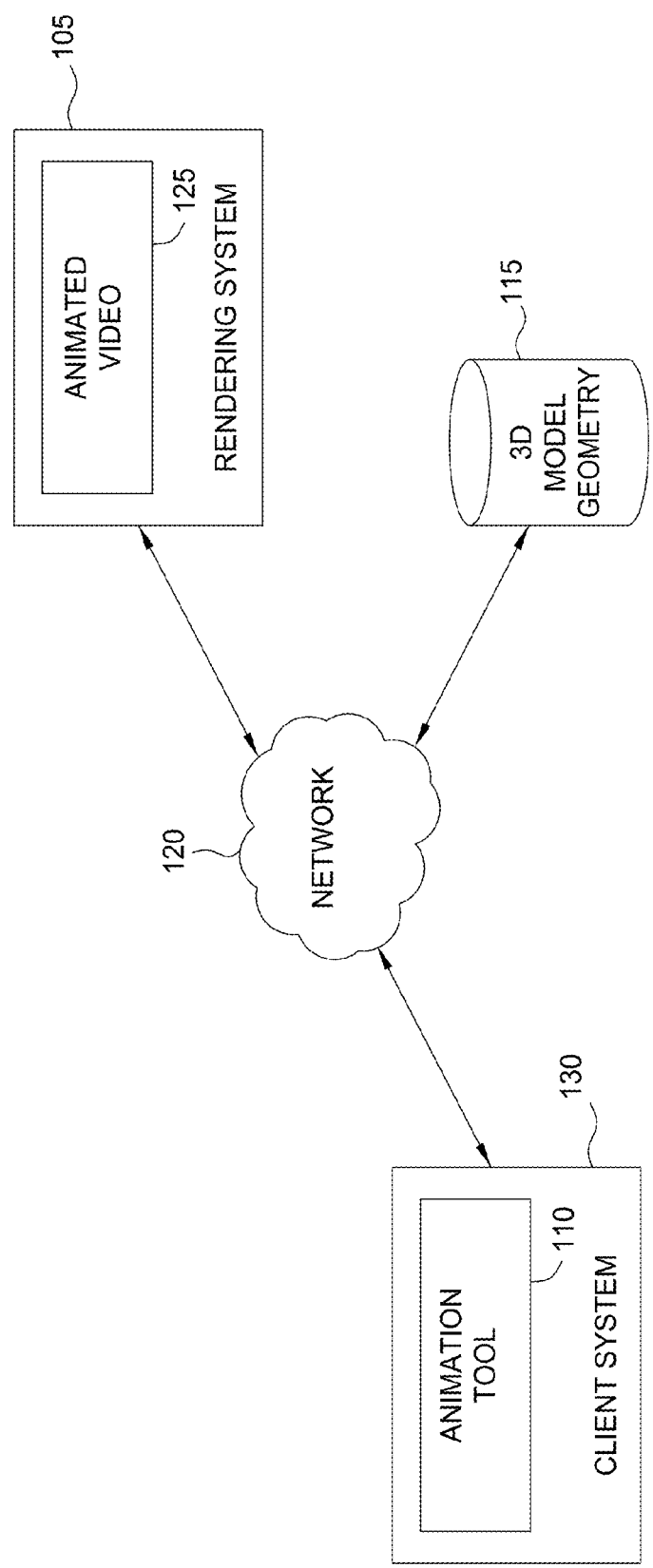
FIG. 1 illustrates a computing infrastructure configured to provide an artist with an animation tool, according to one embodiment of the invention.

Embodiments of the invention provide techniques for creating animated video frames which include both computer generated elements and hand drawn elements. For example, one embodiment includes a software tool which allows an artist to draw line work on an animation frame rendered from a three dimensional (3D) model. The software tool may be configured to determine how to modify such hand drawn line work in one frame in order to appear in subsequent (or prior) frames in a manner consistent with changes in rendering the underlying 3D geometry.

In one embodiment, a screen space velocity map may be created to show a direction and velocity for point locations in a two dimensional (2D) screen space generated from a rendering of 3D geometry. Without loss of generality, such points may correspond to pixels in an animation frame and the discussion below generally refers to pixels as a matter of convenience. More generally however, points in the 2D screen space generated by rendering a 3D model may be sampled using any approach suitable for the needs of a particular case. For example, a screen space could be rendered using a [0 . . . 1] interval, creating a screen space velocity map of an arbitrary precision. Sampled values from such a screen space velocity map could be mapped to a pixel value at a given display resolution as needed. A screen space velocity map (also referred to interchangeably as a pixel velocity map when referring to pixels in an animation frame) may show a measured velocity (i.e., a rate and direction of movement) for points in the screen space over a specified time step (e.g., from one frame to the next). However, the velocity is determined relative to changes in the 3D model from one frame to the next. More specifically, the software tool may determine how much a particular pixel (or feature) corresponding to a point in a 3D model moves over an arbitrary time sample. Thus, the velocity of a pixel (or other sampled point in screen space) represents the direction and magnitude of movement of that pixel based on changes in the underlying 3D geometry from frame to frame (or other time step).

When an artist composites (or blends) two-dimensional (2D) image data on an image rendered from the 3D model, e.g., by drawing some line work, the velocity of a pixel in screen space (based on changes in the underlying 3D model over time) can be used to effectively animate the 2D image data in subsequent (or previous) frames (or over other time steps). Further, the pixel velocity data can be rendered as color maps used to provide an artist with a measure of how a much the pixels in an animation frame are changing from one frame to another.

In another embodiment, the software tool may be configured to generate a 2D silhouette (referred to as a silhouette feature, curve, or just silhouette) corresponding to the outline of a character or object in a rendered animation frame. Such a 2D silhouette tracks not with the surface of the character (as in texture-mapping), but rather with a tangent edge of that object as seen from the camera position in any given point in time. The derived silhouette remains stable over time with respect to the geometry of the 3D model, even as the silhouette feature slides around the surface of the 3D model, due to the changing positions of the model surface and the camera.

In one embodiment, to generate the silhouette feature, a continuous 2D surface parameterization is defined for a portion of geometry in a 3D graphical model. For example, the continuous 2D surface parameterization can be represented topologically as a sculpted cylinder which contours itself to the surface of the 3D geometry. The resulting sculpted cylinder may be simplified to define a series of rings. Each ring provides a closed loop around the surface of the 3D model. The height of each ring (relative to the sculpted cylinder) provides a first dimension of the 2D surface parameterization. Up to two points on each ring each provide a second dimension of the 2D surface parameterization. Specifically, one (or two) points on each ring are identified which are tangent to a viewpoint of the camera, one on either side of the surface of the 3D geometry enveloped by given ring. These points represent the "edge" of either side of the 3D object for an animation frame identified based on the rendering of the 3D geometry and the position of the camera. Connecting each of the tangent points derived from the plurality of rings provides the 2D silhouette curve. The silhouette feature may be tracked over one or more frames. As the 3D model is animated, the silhouette feature may slide across the surface of the model, but nevertheless remain coherent as tracing the edge of the object.

Further, the resulting 2D silhouette curves may be extruded perpendicular to both the surface of the model and the camera's line-of-sight to make a ribbon, or flange. Using this method, the flange slides around the 3D model in reaction to the object or camera's changing motion, but does not slide up or down the sculpted cylinder. That is, while the tangent points may move around the closed loop of the ring on the surface of the object, the ring itself remains generally fixed in place on the character object. Thus, the ribbon provides a stable platform for any kind of silhouette-based artistic effect. For example, the ribbons of the silhouette may be rendered using a grainy charcoal effect to give the appearance of hand drawn line work, but one where the graininess remains much more constant from frame-to-frame. Similarly, the flange provides a small canvas which can guide a user in augmenting a rendered image with hand drawn line work or other 2D image data. Further, in either case, the velocity of points on the silhouette ribbon (i.e., a magnitude and direction of movement of over an arbitrary time step, such as from frame to frame) can be generated for the flange. Doing so allows the 2D image data of the silhouette (e.g., line work, image data or other silhouette based artistic effect) to be animated in a sequence of frames (moving either forward or backward based on rendering of the 3D geometry of the relevant time steps).

Note, while discussed separately, the techniques for generating pixel velocity maps, for animating 2D line work and for generating silhouettes may be combined, to operate in conjunction with one another as well as combined with other techniques for generating (or modifying) animation frames. For example, as just noted, the approaches for determining pixel velocity and animating 2D image data may be applied to the 2D silhouette ribbons generated for an animated 3D character. Further, the examples used below to illustrate embodiments of the invention generally use the rendered appearance of an animated "character." However, one of ordinary skill in the art will recognize that the techniques described herein are in no way limited to use with anthropomorphic characters, and instead may be used to create combinations of CGI renderings and hand drawn line work, and silhouettes, for any underlying 3D geometry.

Additionally, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 illustrates a computing infrastructure 100 configured to provide an artist with an animation tool 110, according to one embodiment of the invention. As shown, the computing infrastructure 100 includes a rendering system 105, a client system 130, and a source of 3D model geometry 115, each connected to a communications network 120. Illustratively the rendering system 105 includes an animated video 125 generated from the 3D model geometry 115. The rendering system 105 generally represents a computing system configured to generate animation frames (i.e., a 2D array of pixel color values) from 3D model geometry 115, typically under the direction and control of a user interacting with the animation tool 110. While FIG. 1 includes a single rendering system 105, sophisticated rendering environments typically include many such systems rendering different frames of animation simultaneously. Further, while shown as distinct computing systems, the functions of the animation tool 110, rendering system 105 and storage for the 3D model geometry 115 may be combined on a single computing system (or further subdivided across multiple computing systems).

In this particular example, client system 130 represents a computer system executing the animation tool 110. The animation tool 110 may be used create and edit the 3D model geometry 115, as well as to control the rendering of such geometry generated by the rendering system 105. As described in greater detail below, in one embodiment, the animation tool 110 may be configured to generate pixel velocity maps as well as composite line work drawn by an artist on frames of the animated video. The animation tool 110 may also be configured to transform such line work and composite it with subsequent (or previous) frames based on the pixel velocity maps generated by the animation tool 110. Further, the animation tool 110 may be configured to generate a silhouette or ribbon like flange for objects in the animated video 125.

Figure 2A:
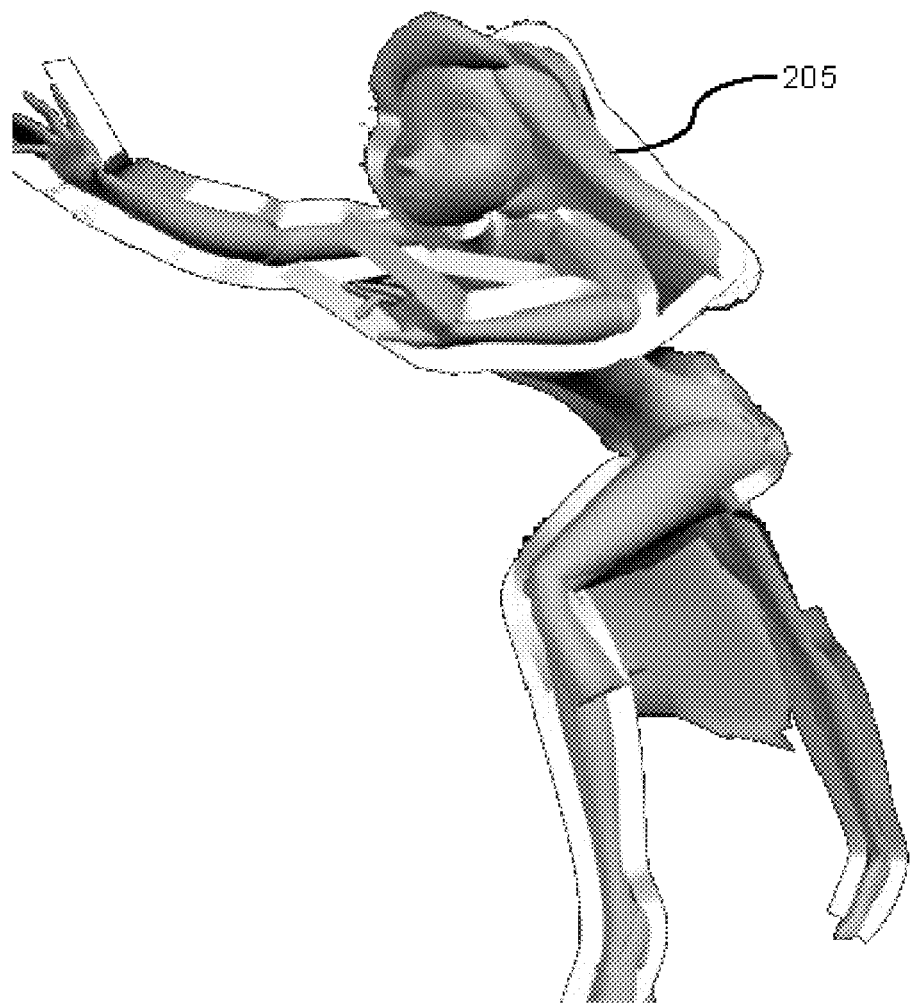
FIG. 2A illustrates an example of a character rendered from a three-dimensional (3D) model, according to one embodiment of the invention.

FIG. 2A illustrates an example of a character 205 rendered from a three-dimensional (3D) model, according to one embodiment of the invention. In this particular example, the rendered frame shows an image of a female character 205. Assume for this example, the 3D geometry corresponding to character 205 provides a 3D graphical model of this character running down a city street generally from right to left across a display screen when fully rendered. When running, portions of character 205 change position at different rates from frame to frame. For example, as shown in FIG. 2A the front leg will move faster than the torso of character 205, and thus have a greater pixel velocity in rendered screen space, until making a footfall, at which point the other leg will begin to exhibit a higher right moving velocity.

More generally, elements of 3D geometry used to render a frame (e.g., a vertex of a polygonal mesh representing the character 205) will change positions from one frame to the next (or previous) or over other time steps. In response, the rendered frames of this 3D model will change accordingly as well. In one embodiment, an animation tool may be configured to generate a pixel velocity map representing the dynamic velocity of each pixel in a rendered frame, relative to changes in the 3D model determined over an arbitrary time step (e.g., from one frame to the next). That is, a pixel velocity map represents how much one pixel may be moving (including both a magnitude and a direction) within screen space from one frame to the next (or to the previous) frame, where the magnitude and direction of the pixel velocity in screen space is derived relative to changes in the underlying 3D model.

Figure 2C:
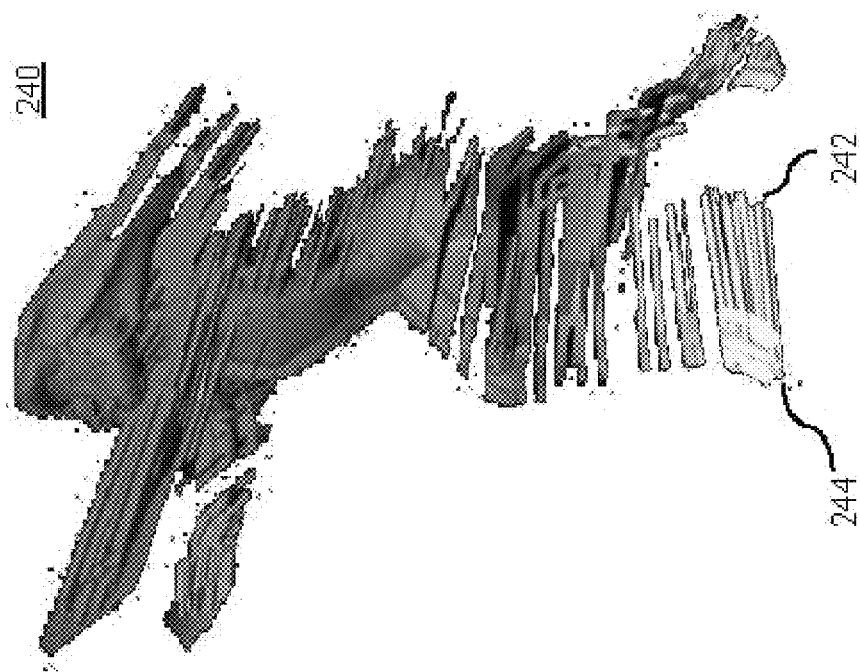
FIGS. 2B-2C illustrate graphical representations of a pixel velocity map corresponding to the character rendered in the animation frame shown in FIG. 2A, according to one embodiment of the invention.
Figure 2B:
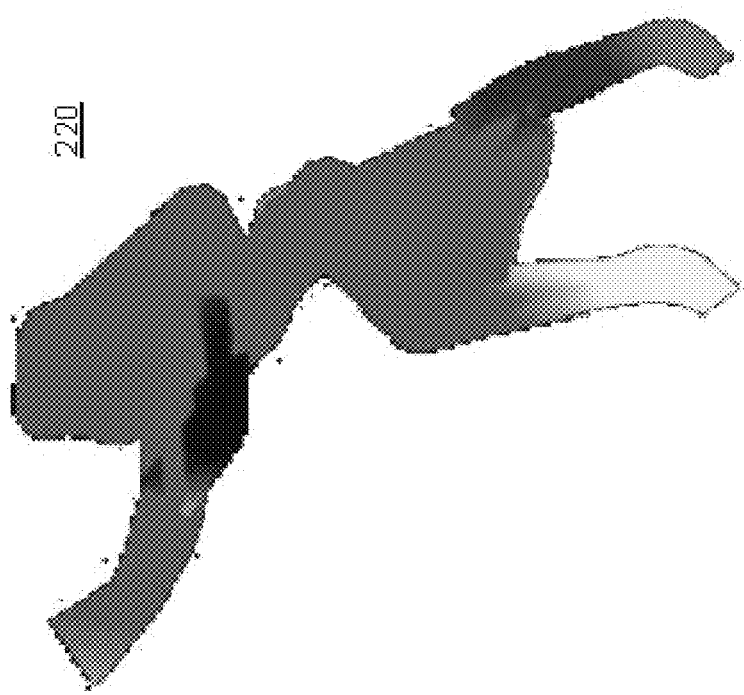

For example, FIGS. 2B-2C illustrate graphical representations of a screen space velocity maps corresponding to the character rendered in the animation frame shown in FIG. 2A, according to one embodiment of the invention. In one embodiment, a screen space, or pixel velocity map may represent velocity for points in screen space (e.g., pixels) using grayscale values, e.g., where brighter pixels represent greater velocity. Alternatively, by adding a color dimension, both the direction and magnitude of velocity of points in screen space may be represented in a velocity map. For example, FIG. 2B shows, a screen space velocity map 220 where a rendered color of a pixel presents a measure of pixel velocity for that pixel in that frame. Note, the velocity may be measured for an arbitrary forward or backward time step. In this example, the velocity is presumed to measure pixel velocity for a current frame relative to a previous frame. Also in this example, the horizontal velocity of a pixel is represented using the color red, and the brightness of a given pixel corresponds to the magnitude of horizontal movement. That is, greater rightward velocity results in a brighter red color for a pixel in the pixel map (up to the display limits of a display screen). At the same time, the vertical velocity of a pixel is represented using the color green, where pixels moving up in a vertical direction are colored green, again where the brightness of a given pixel corresponds to the magnitude of vertical movement. The relative contribution the movement of a pixel in the rightward and upward direction leads to a composite where a pixel moving up and right is colored yellow, with a brightness determined by the combined magnitudes of moment. Note, pixel velocities to the left or down do not contribute to the composite color (or brightness) of a pixel in this example. Of course, other colors could be chosen, the directions could be changed and colors could be assigned for horizontal movement to the left and vertical movement down. By rendering pixels using a color selected as a composite of vertical and horizontal velocity, pixel velocity map 220 shows the general movement and direction of each pixel of the character 205 for pixel velocities moving up and to the right.

Similarly, FIG. 2C illustrates a screen space velocity map 240 that uses color to represent the direction of pixel velocity. However, in addition to a color representing direction, the magnitude of pixel velocity is also shown by rendering each pixel as a vector representing an initial position of that pixel in screen space (based on the underlying geometry of the 3D model) and a subsequent position of that pixel over a time step, e.g., from one frame to the next. By rendering the change in position of each pixel from one frame to the next, the pixel velocity map 240 shows both the magnitude and direction of changes to the pixels in screen space, as the underlying 3D model is used to render frames. For example, a pixel at point 242 is shown. The movement of this pixel (i.e., its velocity) in a particular direction over a time step is shown at an end position 244. The effect results in a pixel velocity map 240 where the general appearance of the pixel velocity vectors stack to resemble a collection of dowels. Each such dowel represents a pixel moving with a given magnitude and direction. As with FIG. 2B, the color and brightness of each pixel velocity vector is determined relative to movement of a pixel up and to the right.

Figure 3:
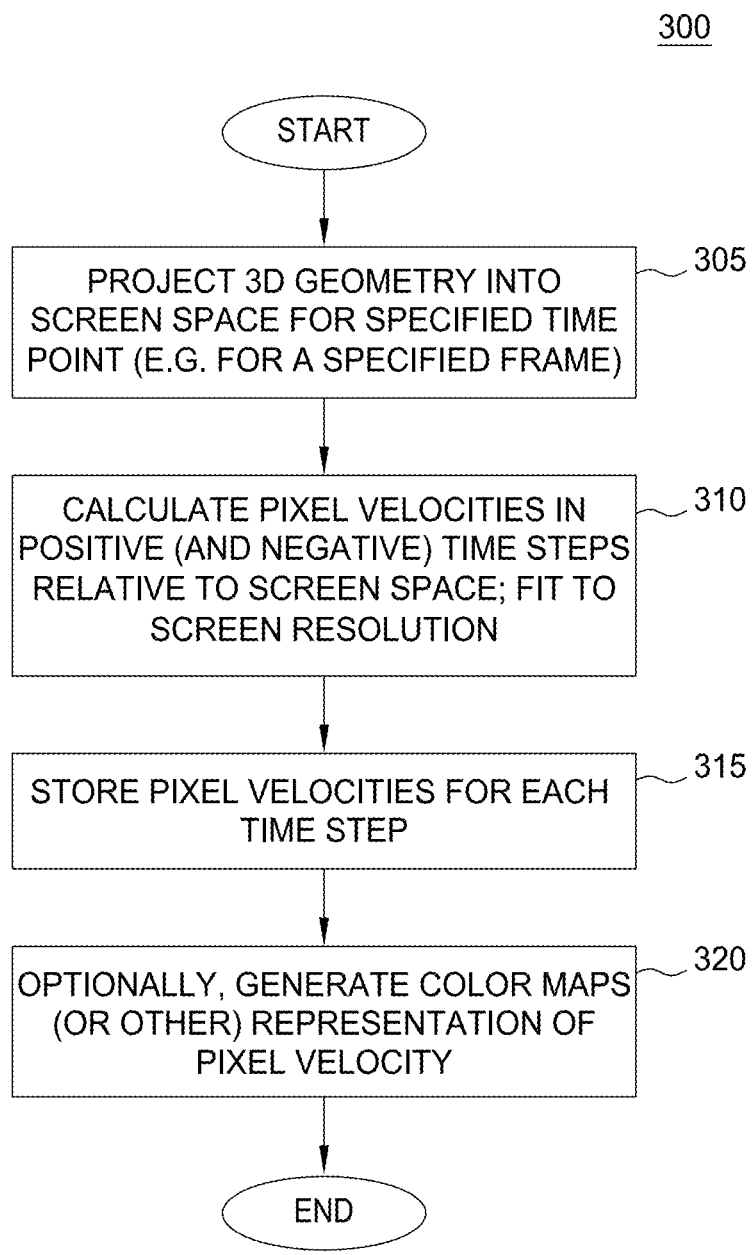
FIG. 3 illustrates a method for generating a pixel velocity map, according to one embodiment of the invention.

FIG. 3 illustrates a method 300 for generating screen space velocity maps, such as the maps shown in FIGS. 2B-2C, according to one embodiment of the invention. As shown, the method 300 begins at step 305 where the 3D geometry of a model is projected into screen space, relative to elements of the model visible to a rendering camera. For example, a rendering application may receive a 3D model defined using a polygonal mesh and generates animation frames based on a defined position of a camera and the topology of the 3D model. Each rendered image of the geometry generally corresponds to an animation frame.

At step 310, the animation tool may calculate velocities for coordinate locations (e.g., pixels) in screen space in positive (and/or negative) time steps. As noted, the screen space velocities are determined relative to changes in the 3D model over the specified time steps (e.g., from frame-to-frame) but translated to provide a pixel velocity relative to changes in screen space. For example, the direction and magnitude of movement of a given pixel is measured in screen pixels, as determined relative to changes in the underlying 3D model over the specified time steps. If the screen space is sampled using a resolution that differs from a display screen, then the resulting screen space velocity map may be normalized to the resolution of a display screen. For example, if a screen space is sampled over a continuous range from 0 to 1 (to some decimal point), then the point velocity values can be mapped into a pixel space resolution. At step 315, the animation tool may store the calculated velocity for the pixels over each specified time step. That is, the animation tool may store the screen space velocity maps generated for each time step.

In one embodiment, e.g., a user may specify an animation sequence encompassing a specified number of frames. From a specified starting frame, the animation tool renders (or causes to be rendered) a number of subsequent and/or previous frames. A pixel velocity map may be generated to identify pixel velocities between any two frames in the sequence. Once generated, the animation tool may store the resulting pixel velocity maps. At step 320, the animation tool may create a representation of a pixel velocity map. For example, pixel velocity may be represented using colors (as shown in FIG. 2B) or as a set of vectors showing the direction and magnitude of pixel velocity (as shown in FIG. 2C). Of course, pixel velocity may be represented using a variety of different colors schemes, grayscale values, intensity values, or coded patterns, etc.

Figure 4B:
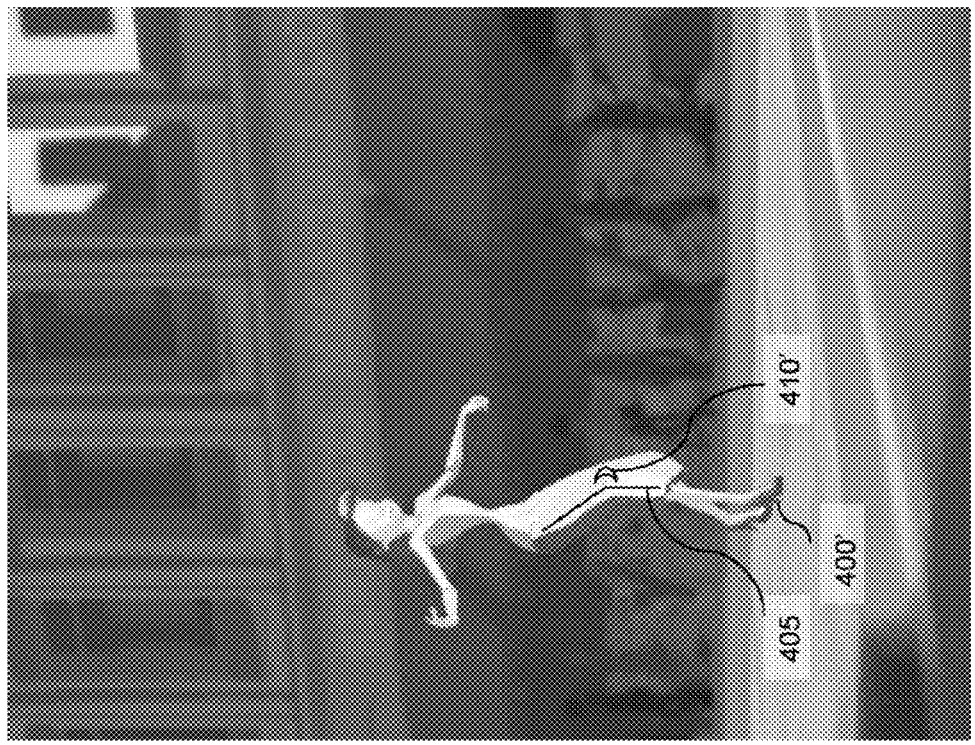
FIGS. 4A-4B illustrate example animation frames rendered from a three-dimensional (3D) model which include hand drawn 2D line work rendered using pixel velocity maps, according to one embodiment of the invention
Figure 4A:
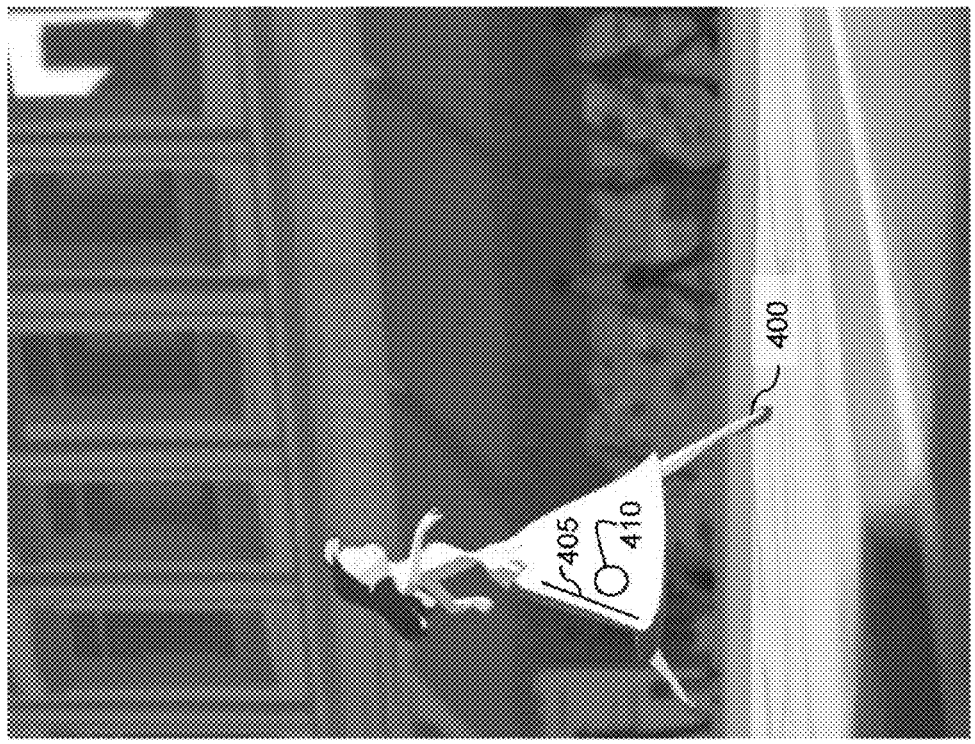

Further, in one embodiment, the pixel velocity maps may be used to animate 2D image data, line work or other 2D artistic effects composited with an animation frame by an artist over the specified time steps. For example, FIGS. 4A-4B illustrate example animation frames rendered from a three-dimensional (3D) model which include hand drawn 2D line work drawn on one frame rendered in subsequent frames using pixel velocity maps, according to one embodiment of the invention. As shown, a rendered character 400 is running down a city street, where the legs of the character 400 show a full stride in progress. As a result, much of the surface of the skirt worn by character 400 is visible in this frame. Further, as shown, an artist has added hand drawn line work to the rendered clothing of the character 400. Specifically, a line 405 and a circle 410 have been drawn on the dress of the character in the animation frame shown in FIG. 4A.

The animation tool may generally be configured to composite the line work supplied by the artist with the animation frame. Conventionally, an artist would have to add line work to each subsequent frame to continue the effect. In one embodiment, however, the pixel velocity maps are used to animate the 2D line work (e.g., line 405 and circle 410) in subsequent (or previous) frames. For example, FIG. 4B represents a frame rendered several time steps after the frame shown in FIG. 4A. As shown in FIG. 4B, the character 400' has reached a curb and both feet are positioned relatively close together. As a result, the visible surface area of the skirt on character 400' is much smaller. Further, the pixel velocities corresponding to the pixels rendered from the 3D model covered by the line 405 and the circle 410 have been used to determine a magnitude and direction to move each pixel of the line 405' and the circle 410' over each time step, resulting in a bent line and deformed circle.

More specifically, for each time step of the rendered animation (e.g., for each frame between the frame shown in FIG. 4A and the frame shown in FIG. 4B), the pixel velocity map is used to translate elements of 2D image data, e.g., the line work of the line 405 and circle 410 from an initial position to an ending position. Accordingly, the shape of the line 405' and the circle 410' have changed in a manner generally consistent with the changes in the shape of the skirt rendered on character 400. Thus, the pixel velocity maps are used to effectively animate the 2D image data supplied by the artist over the subsequent (or previous) time steps, without requiring input from the artist. Of course, the artist could also manually edit the resulting 2D image data generated by the pixel velocity maps if needed to create a desired appearance or aesthetic quality.

Figure 5:
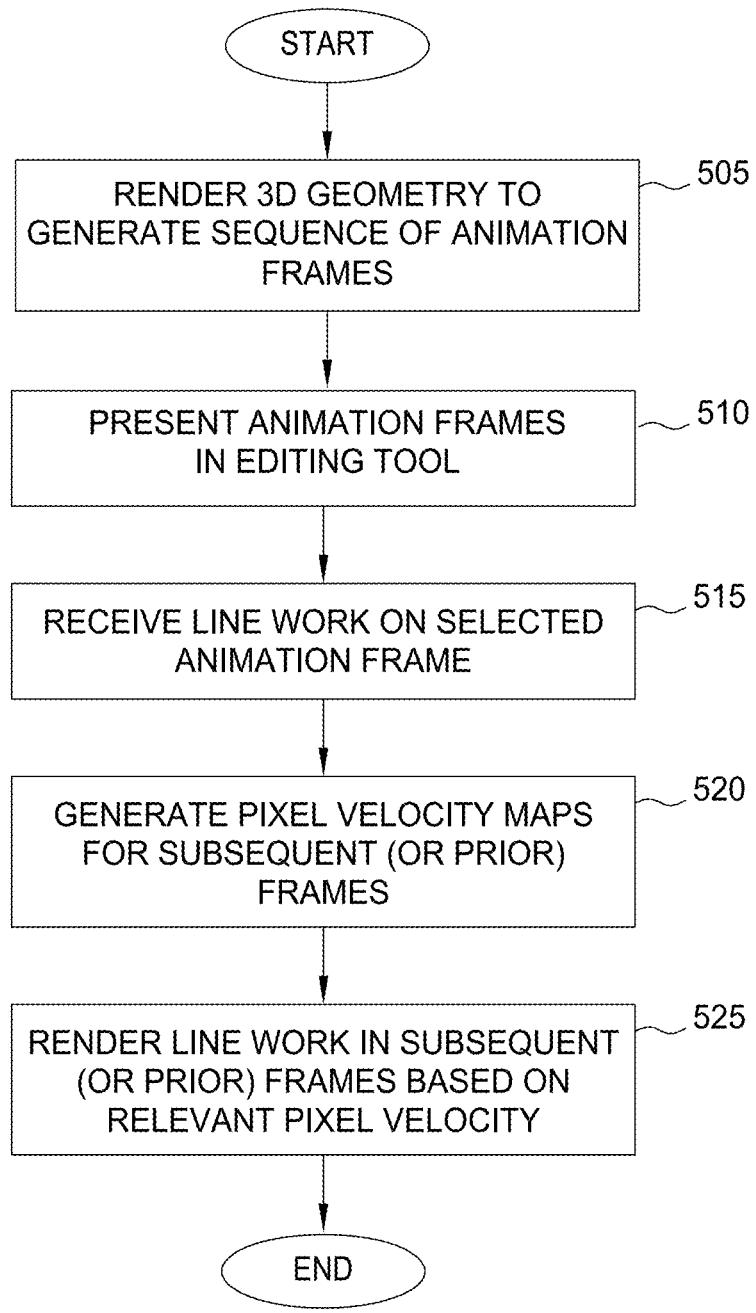
FIG. 5 illustrates a method for rendering hand drawn 2D line work using pixel velocity maps, according to one embodiment of the invention.

FIG. 5 illustrates a method 500 for rendering hand drawn 2D line work using pixel velocity maps, according to one embodiment of the invention. As shown, the method 500 begins at step 505 where the animation tool renders (or causes to be rendered) a sequence of animation frames. At step 510, the rendered frames are represented by a user interacting with an editing tool. Such a tool may be configured to allow the user to step through the rendered frames one by one. At step 515, the user may composite 2D image data with one of the frames using a drawing tool. At step 520, the animation tool may generate (or retrieve) screen space velocity maps for each time step (e.g., a pixel velocity map generated to represent pixel velocity between each animation frame). At step 525, the animation tool may animate the 2D image data provided for one frame in one or more successive (or preceding) frames using the screen space velocity maps. That is, each element of 2D line work or other 2D image data is translated by a direction and magnitude determined using the screen space velocity maps. Doing so animates the 2D image data in a manner consistent with changes in the underlying 3D geometry. The resulting 2D image is composited with the animation frames generated for each successive (or preceding) time step.

As noted above, in addition to generating screen space or pixel velocity maps, the animation tool may be configured to generate a 2D silhouette for a character or other object depicted in a sequence of animation frames. Unlike texture mapping, where a texture is applied to the surface of an object, the silhouette aligns with a tangent edge of that object as seen from the camera position at any given point in time. The 2D silhouette remains stable over time with respect to the geometry of the 3D model, even as the shape of the 2D silhouette "slides" around the surface of the 3D model, due to the changing positions of the model surface and the camera. Further, a variety of 2D graphic effects may be applied to the 2D silhouette as needed to create a silhouette for an object having a desired aesthetic appearance. Further still, by generating a screen space velocity map for a rendered image, the 2D silhouette, line work, or other 2D image data applied to the silhouette may be animated in the same manner as described above for image data supplied by an artist.

Figure 6:
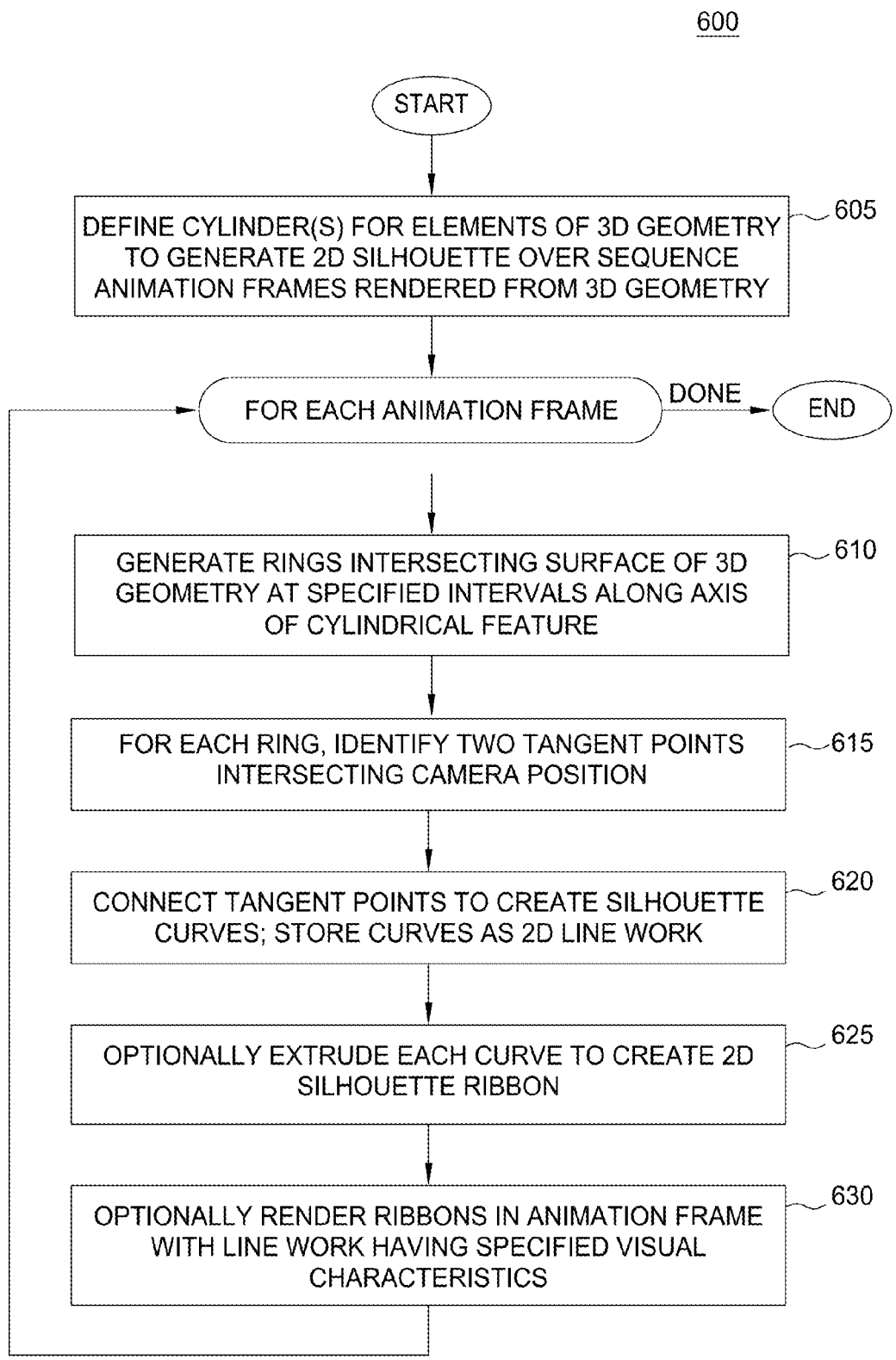
FIG. 6 illustrates a method for generating a 2D silhouette for a 3D object rendered in a sequence of animation frames, according to one embodiment of the invention.

FIG. 6 illustrates a method for generating a 2D silhouette feature for geometry of a 3D graphical model rendered in a sequence of animation frames, according to one embodiment of the invention. Aspects of the method 600 are described in conjunction with FIGS. 7A-7B, which illustrate an example of generating a silhouette flange for a 3D graphical model. As shown, the method 600 begins at step 605, where a user interacts with the animation tool to define a cylindrical feature corresponding to elements of 3D geometry in a 3D graphical model. The cylindrical feature is used to derive a 2D silhouette defining the visible edge of 3D graphical model for each of a sequence of animation frames. For example, the animation tool may include a drawing tool used to "paint" a cylinder onto a portion of 3D model geometry. In response, the animation tool may "fit" the cylinder to the 3D geometry of the object in each animation frame rendered from the geometry. For example, the animation tool may shrink the cylinder until it intersects with the surface of the 3D geometry in each frame.

Once the topology of the resulting cylindrical feature wrapping the 3D geometry is determined, a loop begins that includes steps 615-630. With each pass through the loop, the animation tool generates geometry corresponding to a 2D silhouette tracing the visible edge of the geometry in a given frame. More generally, the cylindrical feature is used to derive continuous 2D surface parameterization for a portion of geometry in a 3D graphical model defining a silhouette in each frame. At step 610, the animation tool may subdivide the cylinder into a series of rings. The number of rings and/or the distance between rings may be set as a matter of preference. Each ring provides a closed loop wrapping around the surface of the 3D model, generally perpendicular to the axis the cylindrical feature. The position of each ring provides a first parameter for the 2D parameterization of the silhouette feature.

Figure 7B:
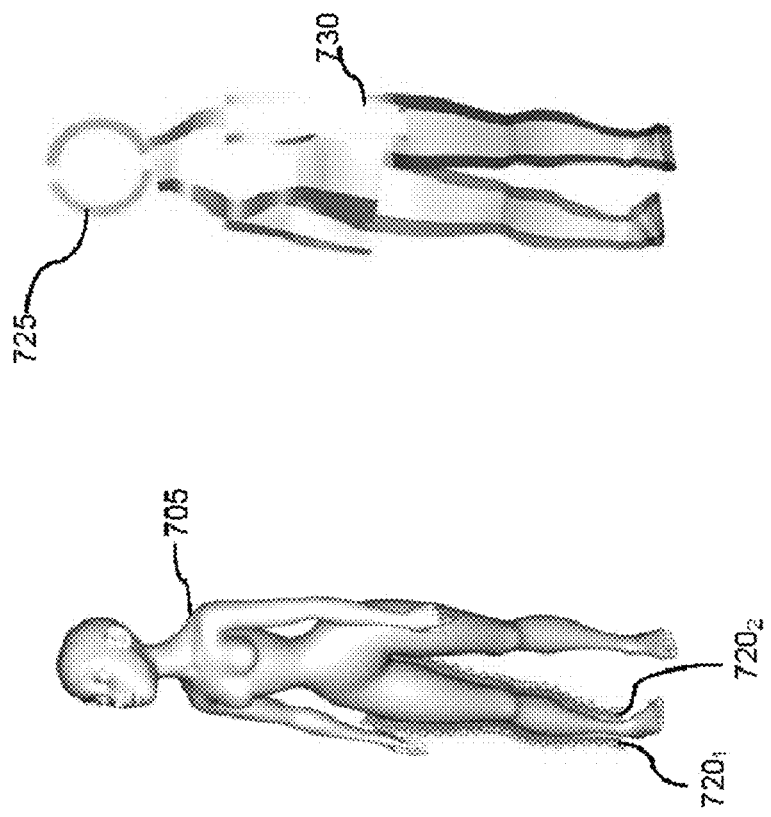
FIGS. 7A-7B illustrate an example of generating a silhouette flange for a 3D model rendered in a sequence of animation frames, according to one embodiment of the invention.
Figure 7A:
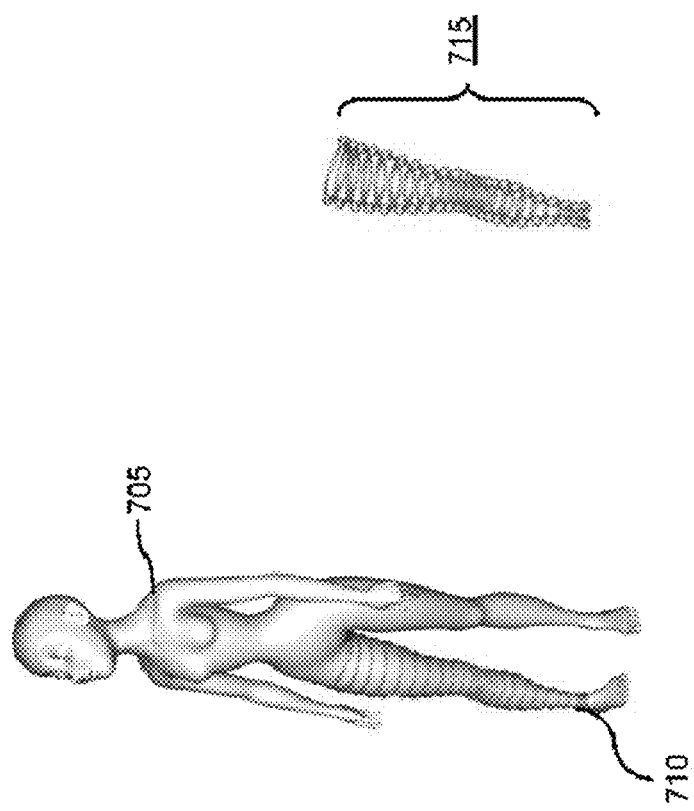

For example, FIG. 7A shows a character 705—in this case a female character standing upright. An artist has used the animation tool to specify the boundary for a cylinder as generally corresponding to the left leg (from the perspective of the artist) of character 705. In response, the animation tool has identified a cylindrical feature that intersects the surface of this leg and subdivided this feature into rings over relatively short intervals along the axis of the cylinder. For example, beginning at ring 710, FIG. 7A shows a series of rings moving upwards from ring 710 until the geometry of the leg intersects the torso of character 705. To create a complete silhouette, additional cylinders could be defined for the other leg, each arm, torso and head of the character 705. As noted the position (e.g., the height along the cylinder) of each ring on the 3D geometry provides a first parameter for the 2D parameterization of a silhouette curve.

Referring again to method 600, at step 615 two points on each ring are used to identify a point on a left and right (or top and bottom) curve representing a 2D silhouette of the character for each frame of animation generated from the 3D model. Specifically, in each frame, each ring has exactly two points tangent to the viewpoint of a rendering camera—one of the left and right (or top and bottom) of each ring. For example, FIG. 7A shows the rings 715 and tangent points determined for left and right sides of the leg of the character 705. As shown, each ring includes a left and right point, again where each point is determined as a point on the ring tangent to the viewpoint of the camera. The tangent points provide the second parameter for the 2D parameterization of a silhouette curve.

Figure 8:
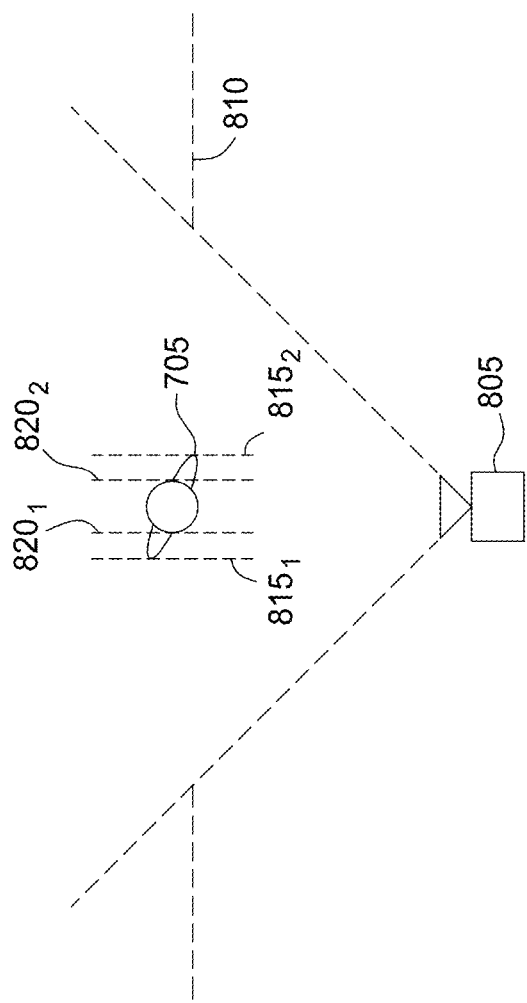
FIG. 8 illustrates an example of tangent points being identified for points on a 3D model, according to one embodiment of the invention.

FIG. 8 shows an additional example. More specifically, FIG. 8 illustrates an example of tangent points being identified for points on a 3D model, according to one embodiment of the invention. As shown in a top down view, a rendering camera 805 shows the head and shoulders of character 705. The character is within a viewing plane 810 of the camera. In this example, assume a cylinder has been defined for the head and torso of character 705. Tangent lines $815_{1-2}$ show tangent points for the torso cylinder and tangent lines $820_{1-2}$ show tangent points for the head.

Referring again to method 600, at step 620, the animation tool connects the tangent points to create left and right (or top and bottom) silhouette curves. Each such curve provides a 2D curve that traces the edge of the 3D geometry, as that geometry is rendered in a given frame of animation. Additionally, at step 625, the animation tool may extrude each curve to create ribbons, or a flange, of 2D geometry providing a silhouette of the character.

In one embodiment, the tangent points corresponding to each of the two curves are extruded perpendicular to the surface of the model and the camera's line-of-sight to make a ribbon, or flange. This result is shown in FIG. 7B where a ribbon $720_{1-2}$ connects the tangent points extended along the surface normals of each such point for both the left and right side of the leg of the character 720. A complete set of tangent ribbons for character 705 is shown, without the character geometry, at 725. The ribbons provide a collection of 2D image data that may be composited with the rendered animation frames. Note, given the topology of the 3D geometry in a given frame, some portions of the silhouette curve (or ribbon flange extruded therefrom) may be occluded by other elements of 3D geometry. For example, as shown at 730, the ribbon silhouette corresponding to the right arm of the character 705 occludes a portion of the silhouette corresponding to the right hip of character 705.

Figure 9B:
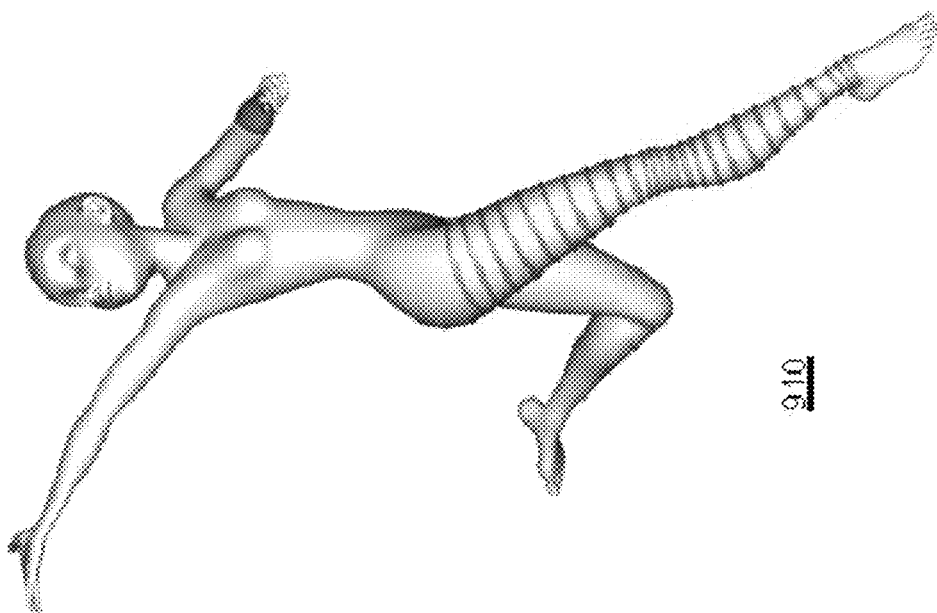
FIGS. 9A-9B illustrate an example of using points along a cylinder to generate a silhouette flange for a 3D model rendered in two different animation frames, according to one embodiment of the invention.
Figure 9A:
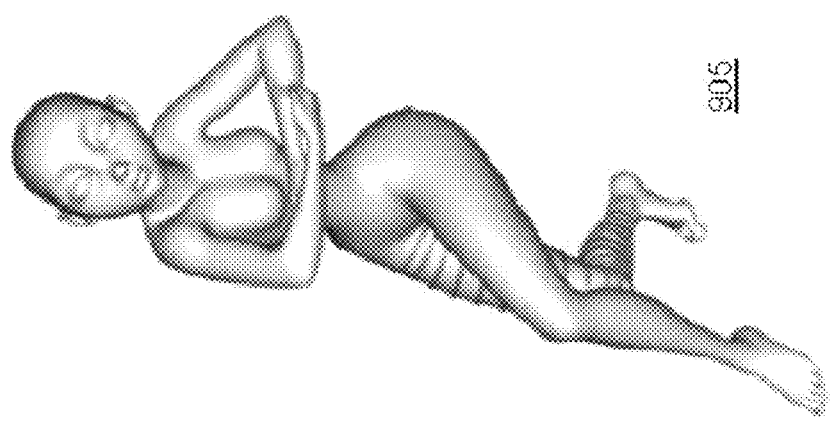

Another example of a generating a silhouette curve is shown in FIGS. 9A-9B. More specifically, FIGS. 9A-9B illustrate an example of deriving tangent points along a cylinder to generate a silhouette flange for a 3D model of a dancing female character, as rendered in two different animation frames. As shown, character 905 is generally facing the camera and much of the leg with the cylinder rings is occluded by the other leg. In contrast, character 905 has turned, clearly revealing the leg with the cylinder ring. As these images demonstrate, the rings of a given cylinder stay temporally coherent, despite dramatic changes in the geometry of the rendered object.

At the same time, points on the cylinder rings tangent to the camera change from frame to frame. That is, the shape of the silhouette itself slides across the character as the tangent points of the rings change from frame to frame. This result in shown in FIGS. 10A-10B, which illustrates the silhouette flange shown for the dancing female character from FIGS. 9A-9B using an alternative camera angle. More specifically, FIGS. 10A-10B show a view of the dancing character with a camera fixed in the front of the character for both frames. However, the silhouette flanges $1020_{1-2}$ correspond to a silhouette generated for the camera angles used in FIGS. 9A-9B. As shown by these figures, while the silhouette itself remains temporally coherent along the edges of the character across different frames (as determined using the tangent points on the rings), the position of the silhouette edges or ribbon will slide along the surface of the 3D geometry as the object changes in shape or position within 3D space (or as the camera moves) from frame to frame (or over some other time step).

Figure 11B:
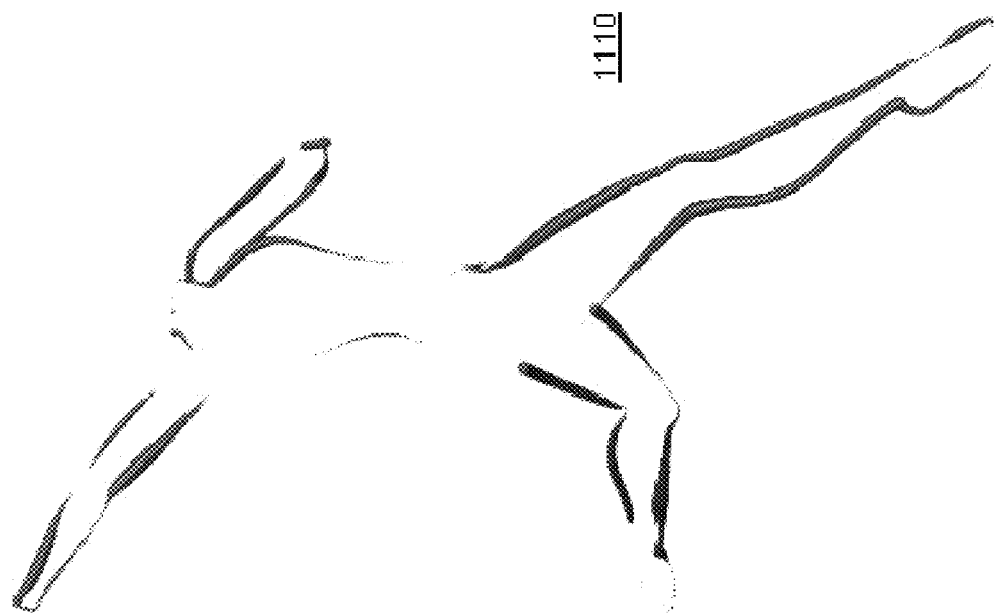
FIGS. 11A-11B illustrate 2D line work generated from the silhouette flange of the 3D model shown in FIGS. 9A-9B, according to one embodiment of the invention.
Figure 11A:

Referring again to method 600, at step 630 the animation tool may generate 2D image data to composite with the rendered animation frames—effectively adding a visible silhouette to animation frames rendered from 3D geometry. Further, the 2D image data may be generated to have a variety of different visual characteristics, e.g., different colors, thickness or line styles, as well as though it had been drawn using different media, ink, pencil, charcoal, paint, etc. For example, FIGS. 11A-11B illustrate a 2D silhouette of the 3D model shown in FIGS. 9A-9B, according to one embodiment of the invention. In this example, the silhouette of the dancing character 1105 and 1110 is drawn using a line style that mimics a hand drawn appearance, where potions of the line work vary in thickness and darkness.

Figure 12:
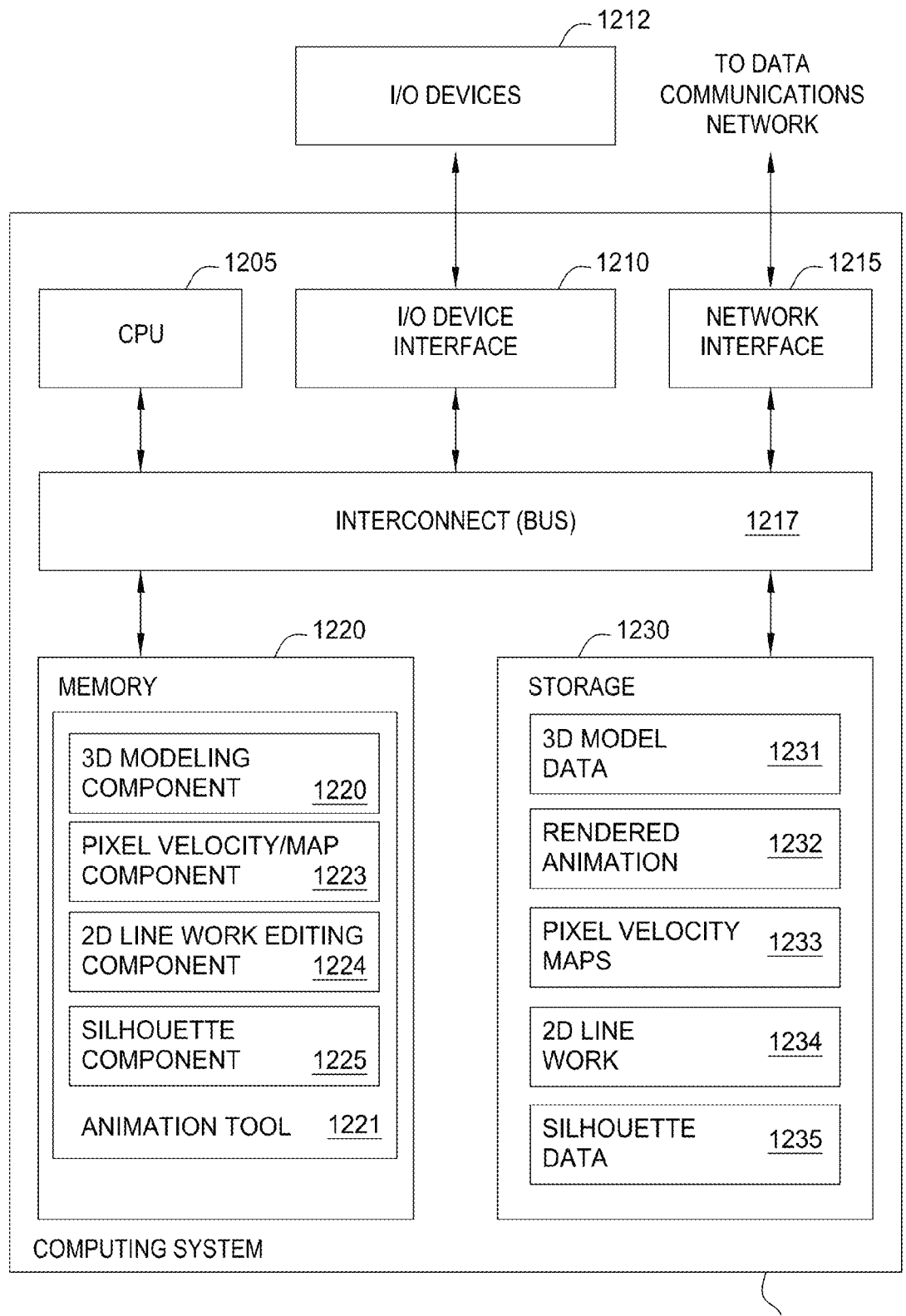
FIG. 12 illustrates an example computing system configured to implement embodiments of the invention.

Similarly, the silhouette ribbons provide a 2D drawing canvas for an artist to supply line work or other 2D image data which can be composited with the image frames generated from the 3D image data. Such 2D image data supplied for the silhouette of one frame can be animated in subsequent (or previous frames) using the pixel velocity maps described above. The resulting 2D animation data can be composited with subsequent animation frames to create a desired visual effect FIG. 12 illustrates an example computing system 1200 configured to implement embodiments of the invention. As shown, the computing system 1200 includes, without limitation, a central processing unit (CPU) 1205, a network interface 1215, a bus 1217, a memory 1220, and storage 1230. The computing system 1200 also includes an I/O device interface 1210, connecting the computing system 1200 to I/O devices 1212 (e.g., keyboard, display and mouse devices). The computing system 1205 provides a computing system which allows a user to generating pixel velocity maps, for animating 2D line work and for generating 2D silhouettes for frames of rendered 3D geometry.

CPU 1205 retrieves and executes programming instructions stored in the memory 1220. Similarly, CPU 1205 stores and retrieves application data residing in the memory 1220. The bus 1217 is used to transmit programming instructions and application data between the CPU 1205, I/O devices interface 1210, storage 1230, network interface 1215, and memory 1220. CPU 1205 is included to be representative of a single CPU, multiple CPUs, a single CPU having multiple processing cores, and the like. And the memory 1220 is generally included to be representative of a random access memory. The storage 1230 may be a disk drive storage device. Although shown as a single unit, the storage 1230 may be a combination of fixed and/or removable storage devices, such as magnetic disc drives, solid state drives (SSD), removable memory cards, optical storage, network attached storage (NAS), or a storage area-network (SAN).

Illustratively, the memory 1220 includes the animation tool 1221, which itself includes a 3D modeling component 1222, a pixel velocity map component 12223, a 2D line work editing component 1224 and a silhouette generating component 1225. And storage 1230 includes 3D model data 1231, rendered animation frames 1232, pixel velocity maps 1233, 2D line work 1234 and silhouette data 1235. Of course, one of ordinary skill in the art will recognize that the functional components of the animation tool 1221 can be implemented using a variety of approaches.

As described above, the 3D modeling component 1222 allows a user to render 3D model data 1231, e.g., to generate a sequence of rendered animation frames 1232. Further, once a set of frames have been rendered, the pixel velocity map 1223 may be used to derive pixel velocity maps 1233 for the rendered animation frames 1232. Further still the 2D line work component 1224 may allow an artist to draw 2D line work 1234 composed with rendered animation frames. The 2D line work component 1224 may also be configured to animate the line work over one or more time steps in a forward or backward direction. The silhouette component 1225 may be configured to generate silhouette data 1235 for the rendered animation frames 1232.

Advantageously, embodiments of the invention provide techniques for creating animated video frames which include both computer generated elements and hand drawn elements. For example, one embodiment includes a software tool which allows an artist to draw line work (or supply other 2D image data) to composite with an animation frame rendered from a three dimensional (3D) graphical model of an object. The software tool may be configured to determine how to animate such 2D image data provided for one frame in order to appear in subsequent (or prior) frames in a manner consistent with changes in rendering the underlying 3D geometry.

The software tool may also be configured to generate a silhouette curve corresponding to the outlines of a character or object in a rendered animation frame. That is, the software tool may be configured to derive a 2D silhouette which traces the edges of an object in animation frames rendered from a 3D model. By extruding points along the 2D silhouette curve, a variety of graphical effects may be applied to the silhouette. Further, any 2D image data or line work may be animated using pixel velocity maps generated from the underlying 3D model.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing animation frames, the method comprising:
    identifying a first set of animation frames rendered by one or more processors, wherein the first set of animation frames renders three-dimensional (3D) geometry corresponding to a 3D model object at distinct points in time;
    generating, for each frame in the first set of animation frames, a screen space velocity map indicating a dynamic velocity of one or more coordinates in the animation frame relative to changes in points on the 3D model object occurring over one or more specified time steps;
    receiving two-dimensional (2D) image data to composite with a first one of the animation frames; and
    animating the 2D image data over the specified time steps according to the dynamic velocity of the one or more coordinates in the screen space velocity maps.

2. The method of claim 1, wherein the one or more coordinates in the screen space velocity maps are mapped to pixel coordinates in the corresponding animation frame, and wherein the dynamic velocity of each coordinate includes both a magnitude and direction of pixel movement.

3. The method of claim 2, further comprising:
    generating a visual representation of one or more of the screen space velocity maps, wherein the visual representation encodes a magnitude and direction of pixel movement using a specified color scheme.

4. The method of claim 1, wherein the one or more time steps move forward through a rendered animation of the 3D geometry.

5. The method of claim 1, wherein the one or more time steps move backward through a rendered animation of the 3D geometry.

6. A computer-readable storage medium storing a program, which, when executed by a processor performs an operation for processing animation frames, the operation comprising:
    identifying a first set of animation frames rendered by one or more processors, wherein the first set of animation frames renders three-dimensional (3D) geometry corresponding to a 3D model object at distinct points in time;
    generating, for each frame in the first set of animation frames, a screen space velocity map indicating a dynamic velocity of one or more coordinates in the animation frame relative to changes in points on the 3D model object occurring over one or more specified time steps;
    receiving two-dimensional (2D) image data to composite with a first one of the animation frames; and
    animating the 2D image data over the specified time steps according to the dynamic velocity of the one or more coordinates in the screen space velocity maps.

7. The computer-readable storage medium of claim 6, wherein the one or more coordinates in the screen space velocity maps are mapped to pixel coordinates in the corresponding animation frame, and wherein the dynamic velocity of each coordinate includes both a magnitude and direction of pixel movement.

8. The computer-readable storage medium of claim 7, wherein the operation further comprises:
    generating a visual representation of one or more of the screen space velocity maps, wherein the visual representation encodes a magnitude and direction of pixel movement using a specified color scheme.

9. The computer-readable storage medium of claim 6, wherein the one or more time steps move forward through a rendered animation of the 3D geometry.

10. The computer-readable storage medium of claim 6, wherein the one or more time steps move backward through a rendered animation of the 3D geometry.

11. A system, comprising:
    a processor; and
    a memory, wherein the memory includes an application program configured to perform an operation for evaluating pixels in animation frames, the operation comprising:
        identifying a first set of animation frames, wherein the first set of animation frames renders three-dimensional (3D) geometry corresponding to a 3D model object at distinct points in time,
        generating, for each frame in the first set of animation frames, a screen space velocity map indicating a dynamic velocity of one or more coordinates in the first animation frame relative to changes in points on the 3D model object occurring over one or more specified time steps,
        receiving two-dimensional (2D) image data to composite with a first one of the animation frames, and
        animating the 2D image data over the specified time steps according to the dynamic velocity of the one or more coordinates in the screen space velocity maps.

12. The system of claim 11, wherein the one or more coordinates in the screen space velocity maps are mapped to pixel coordinates in the corresponding animation frame, and wherein the dynamic velocity of each coordinate includes both a magnitude and direction of pixel movement.

13. The system of claim 12, wherein the operation further comprises:

generating a visual representation of one or more of the screen space velocity maps, wherein the visual representation encodes a magnitude and direction of pixel movement using a specified color scheme.

14. The system of claim 11, wherein the one or more time steps move forward through a rendered animation of the 3D geometry.

15. The system of claim 11, wherein the one or more time steps move backward through a rendered animation of the 3D geometry.

* * * * *